(12) United States Patent
Matthewson

(10) Patent No.: US 6,889,906 B1
(45) Date of Patent: May 10, 2005

(54) INFORMATION CODING TECHNIQUES

(75) Inventor: Peter Matthewson, Chelmsford (GB)

(73) Assignee: Flying Null Limited, Cambridge (GB)

(*) Notice: Subject to any disclaimer, the term of this patent is extended or adjusted under 35 U.S.C. 154(b) by 430 days.

(21) Appl. No.: 10/048,076

(22) PCT Filed: Aug. 16, 2000

(86) PCT No.: PCT/GB00/03171

§ 371 (c)(1),
(2), (4) Date: Jun. 2, 2002

(87) PCT Pub. No.: WO01/13329

PCT Pub. Date: Feb. 22, 2001

(30) Foreign Application Priority Data

Aug. 16, 1999 (GB) .............................. 9919333

(51) Int. Cl.[7] .............................. G06K 19/06
(52) U.S. Cl. ...................... 235/493; 235/494
(58) Field of Search ................. 235/493, 494, 235/462.01, 462.02, 462.16, 449; 902/27

(56) References Cited

U.S. PATENT DOCUMENTS

| | | | | |
|---|---|---|---|---|
| 3,985,293 A | | 10/1976 | Riffee et al. | |
| 4,571,713 A | * | 2/1986 | Ackerman et al. | 235/494 |
| 4,864,112 A | * | 9/1989 | Imai et al. | 235/462.01 |
| 4,937,436 A | * | 6/1990 | Eglise et al. | 235/449 |
| 5,298,731 A | * | 3/1994 | Ett | 235/462.02 |
| 5,380,998 A | * | 1/1995 | Bossen et al. | 235/494 |
| 5,412,196 A | * | 5/1995 | Surka | 235/494 |
| 5,434,400 A | * | 7/1995 | Scherzer | 235/449 |
| 5,484,998 A | | 1/1996 | Bejnar et al. | |
| 5,552,591 A | | 9/1996 | Bossen et al. | |
| 5,949,051 A | * | 9/1999 | Kiriyama | 235/449 |
| 5,984,193 A | * | 11/1999 | Uhling | 235/494 |
| 6,186,406 B1 | * | 2/2001 | Ackley | 235/494 |
| 6,199,765 B1 | * | 3/2001 | Uhling | 235/494 |
| 6,293,466 B1 | * | 9/2001 | Fujita et al. | 235/462.02 |
| 6,321,986 B1 | * | 11/2001 | Ackley | 235/462.01 |

FOREIGN PATENT DOCUMENTS

| | | |
|---|---|---|
| EP | 472842 A | 3/1992 |
| JP | 4-235693 A * | 8/1992 |
| WO | WO 98/26312 A1 | 6/1998 |

OTHER PUBLICATIONS

C.J. Mitchell, "A Method for Constructing Decodable de Bruijin Sequences", IEEE Transactions on Information Theory, V. 42, N. 5, Sep. 1996.

* cited by examiner

Primary Examiner—Jared J. Fureman
(74) Attorney, Agent, or Firm—Welsh & Katz, Ltd.

(57) ABSTRACT

Magnetically or optically detectable elements are arranged on a substrate so as to encode information to be stored. An information carrier comprises a plurality of individual detectable elements supported by, or incorporated in, a substrate wherein the spacing between the elements serves to encode the information and is such that it can be represented as A+MG, wherein A is a first fixed value, m is an integer (which may be zero) and G is a second fixed value, characterized in that the values of the integer m, are selected to be integers derived by a predetermined mathematical sequence or a random sequence generator.

28 Claims, 1 Drawing Sheet

INFORMATION CODING TECHNIQUES

FIELD OF THE INVENTION

The present invention relates to a method of encoding information and in particular to the way in which magnetically or optically detectable elements can be arranged on a substrate so as to encode the information to be stored.

BACKGROUND OF THE INVENTION

In certain types of human and machine-readable information-bearing label, a set of elements is used to represent the information contained in the label. Information may be conveyed by varying the characteristics of the elements comprising the label, or by varying the position in which the label elements are placed. Reading apparatus is used which senses the is characteristics and location of the elements in order to decode the information contained within the label.

The elements in the label are sequentially scanned, to discover the presence of the constituent elements and to measure their characteristics and position, and hence to decode the information contained by the label.

BRIEF SUMMARY OF THE INVENTION

The present invention relates to label coding methods by which information can be represented on such a label. In one embodiment the label comprises a plurality of magnetically active elements supported on a substrate, the magnetically active elements being capable of anisotropy. Information is coded by controlling the position and shape of the elements.

In another embodiment the label is comprised of a plurality of magnetically active elements supported on a substrate, the magnetically active elements being capable of anisotropy. Information is coded by controlling the angle of orientation of the easy axis and shape of the elements.

In alternative embodiments the label is comprised of a plurality of optically readable elements supported on a substrate. Information is coded by controlling the position and shape of the elements according to the present invention.

According to one aspect of the present invention there is provided an information carrier comprising a plurality of individual detectable elements supported by, or incorporated in, a substrate wherein the spacing between the elements serves to encode the information and is such that it can be represented as A+mG, wherein A is a first fixed value, m is an integer (which may be zero) and G is a second fixed value, characterised in that the values of the integer m, are selected to be integers derived by a predetermined mathematical sequence.

An example of a linear label wherein the gaps are defined by the linear distance between the centres of the elements along the length of the label is provided. The properties of each of the elements may be the same, however information may be advantageously encoded by varying either the length of the elements, that is the size of the element normal to the longitudinal axis of the label, or the width of the elements. By maintaining the element width constant, variations in element length predominantly cause a change in amplitude of the received signal which can be decoded in order to recognise additional information.

Embodiments of the present invention are possible in which the gaps may be represented as an angular separation between the centerline's of adjacent elements or by angular differences in any directional physical property exhibited by the elements.

Variation of the material properties may also be advantageously used to encode additional information. Properties that could be used include the geometric dimensions of the element and also the magnetic properties of the elements. For example the dimensions of the elements such as element length can be varied. Furthermore, one or more such property may be simultaneously varied so as to increase the total information content of the label.

According to another aspect of the present invention, there is provided an information carrier comprising a plurality of individual detectable elements supported by, or incorporated in, a substrate wherein the spacing between the elements serves to encode the information and is such that it can be represented as A+mG, wherein A is a first fixed value, m is an integer (which may be zero) and G is a second fixed value, characterised in that the values of the integer m, are selected to be integers derived by a means of a random number generator.

Preferred embodiments of the present invention allow a bi-directional coding scheme to be employed in which the gap sequence is compared with the reverse gap sequence. Such a scheme allows the direction of reading to be determined.

Furthermore, the present invention advantageously allow, a long label to be encoded using a pattern of gaps with a long repeat distance. The pattern is generated from a binary sequence generator such as a decodable de Bruijn sequence generator, or a pseudo random generator formed typically from a shift register of N bits with feedback from the contents of two taps exclusively "OR"-ed together. The sequence generator preferably provides a maximum length sequence where the gaps between the elements encode the binary elements of that sequence. When coded in ths way a sufficient slice of the label can be decoded to give an unique position in the sequence. A review of the de Bruijn sequence is given in "A Method for Constructing Decodable de Bruijn Sequences" by C. J. Mitchell, published in IEEE Transactions on Information Theory, Volume 42, No. 5, September 1996; the disclosure of this document is incorporated into the present application by way of reference thereto.

According to a further aspect of the present invention there is provided an information coding method utilising a plurality of detectable elements supported by or incorporated in, a substrate, wherein said elements are spaced apart from one another such that the spacing between the elements serves to encode the information and is such that it can be represented as A+mG, wherein A is a first fixed value, m is an integer (which may be zero) and G is a second fixed value, characterised in that the values of the integer m, are selected to be integers derived by a predetermined mathematical sequence.

According to a further aspect of the present invention there is provided an information coding method utilising a plurality of detectable elements supported by or incorporated in, a substrate, wherein said elements are spaced apart from one another such that the spacing between the elements serves to encode the information and is such that it can be represented as A+mG, wherein A is a first fixed value, m is an integer (which may be zero) and G is a second fixed value, characterised in that the values of the integer m, are selected to be integers derived by means of a random number generator.

For a better understanding of the present invention, and to show how the same may be carried into effect, reference will now be made, by way of example to the accompany drawings, in which:

DETAILED DESCRIPTION OF THE INVENTION

Figure 1:
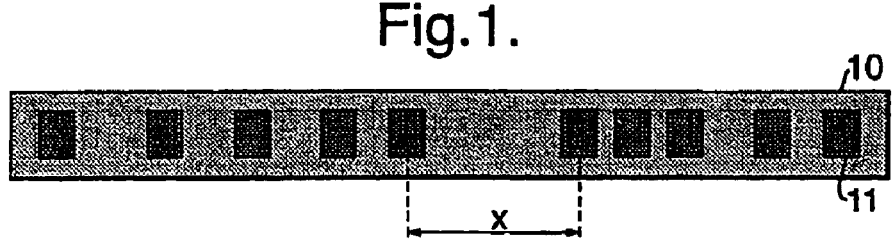
FIG. 1 shows a coded information carrier according to the present invention.

FIG. 1 shows a linear information carrier 10 of the present invention in which a plurality of magnetic elements 11 are arranged on a substrate 12 such that the distance x between the midpoints of the elements defines a series of gaps.

Figure 2:
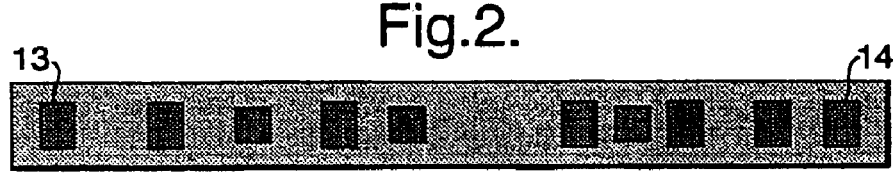
FIG. 2 shows a coded information carrier having coded element properties.

The gaps between the centre points of adjacent elements can be one of a number of distinct possible sizes as shown in FIG. 2. The end elements of the label 13 and 14 would typically be at a fixed distance between their centre points so as to ensure that the label is a constant length irrespective of the information coded into the label.

In a typical scheme, the maximum separation between elements would be determined by the capability of the reading method. For example where the elements are implemented as magnetically active elements which can be individually interrogated by an applied field, the minimum separation may be 1.5 millimeters. The gaps are typically any integer multiple of a fixed distance, chosen with regard to the capability of the reading method. The gap increment may typically be 0.75 mm. Since the end elements are fixed in position, for a given number of elements in the label, the sum of all the gaps must be a constant distance, which when divided by the gap increment will be an integer, the maximum gap size. Each gap an be characterised and represented as the multiple of the gap increment. This multiple g is an integer represented as the multiple of the gap increment. This multiple g is an integer ranging from 0 to the maximum gap size. These multiples are denoted g1, g2, g3 . . . gG where there are G gaps, G being one less than the total number of elements in the label.

Therefore the series of gaps between N+1 individual magnetic elements spaced apart from each other along a predetermined path can be defined as A+mG where A is a first fixed value; m is an integer and G is a second fixed integer.

Each sequence of integers g1, g2, g3 . . . gG whose sum is the maximum gap size therefore represents a unique code space which is characterised by the number of gaps G, and the maximum gap size M. For instance for the label shown in FIG. 1 which has 10 elements and a maximum gap size of 18, the gap sequence for the label code shown in 3, 2, 2, 1, 7, 0, 0, 2, 1 and there are 1562275 unique codes that can be represented in this code space.

By varying the number of elements for a given fixed label length, the number of codes that can be represented is increased.

A method of comparing codes is defined such that if we had 2 codes {a} and {b} for which the gap sequences were a1, a2, a3, . . . , aG and b1, b2, b3, bG then {a} is "greater" than {b} if a1 is greater than b1, or if a1 is the same as b1 ten by comparing a2 and b2 and so on up to aN and bN.

A typical enumeration method is to tabulate the gap sequences in order of magnitude for example by ensuring that the first sequence in the table is "greater" than the second sequence, the second sequence is "greater" than the third sequence and so on. The enumerated code is then the position of the matching gap sequence in the table. If all the corresponding gaps in {a} and {b} are the same, the sequences are considered to be equal.

Furthermore, the present invention also allows a bi-directional coding scheme to be implemented by which the same label code is determined irrespective of whether the label, for example that shown in FIG. 1, is read from left to right, or right to left.

The Bi-directional codes are generated by permuting unique gap sequences for example the gap sequence 3,2,2, 1,7,0,0,2,1 above. The reverse of the gap sequence is formed to produce 1,2,0,0,7,1,2,2,3 in this case. The sequence and its reverse are then compared. The code is accepted as a Bi-directional code if the sequence is "greater" than or "equal" to its reverse. If the code is less than its reverse it is not used. Of the label shown in FIG. 1 which has 10 elements and maximum gap size of 18 there are 781495 unique Bi-directional codes that can be-represented in this code space.

The reading apparatus measures a gap sequence which can then be compared with its reverse; if the reverse sequence is the "greater" of the two it is used instead of the measured sequence of gaps decoding. A typical enumeration method is to tabulate the valid Bi-directional gap sequences in order of magnitude for example bu ensuring that the first sequence in the table is "greater" than the second sequence, the second sequence is "greater" than the third sequence and so on. The enumerated code is then the position of the matching gap sequence in the table.

The use of a Bi-directional coding scheme allows the direction of reading of the label to be determined. The direction finding Bi-directional codes are found by taking each of the unique codes for example the code 3,2,2,1,7,0, 0,2,1 above. The reverse of the gap sequence is formed to produce 1,2,0,0,7,1,2,2,3 in this case. The code and its reverse are than compared. The code is accepted as a Bi-directional enabling direction finding if the code is "greater" than its reverse. If the code is not "greater" than or "equal" to is reverse it is not a valid unique code. For the label shown in FIG. 1, which has 10 elements and a maximum gap size of 18, there are 780080 unique Bi-directional direction finding codes that can be represented in the code space.

When such a code is read, the direction of reading can be found by comparing the sequence of gaps read and its reverse. If the sequence of gaps read is "greater" than its reverse then the direction of reading is interpreted as the forward direction. If not then the label is diagnosed as having been read in the reverse direction.

With such a code, the reading apparatus measures a gap sequence which is compared with its reverse; if the reverse sequence is the "greater" of the two it is used instead of the measured sequence of gaps in decoding. A typical enumeration method is to tabulate the valid Bi-directional direction finding gap sequences in order of magnitude for example by ensuring that the first sequence in the table is "greater" than the second sequence, the second sequence is "greater" than the third sequence and so on. The single entry in this table for each unique code is the "greater" of the gap sequence and its reversed form. The enumerated code is then the position of the matching gap sequence in the table.

Figure 3:
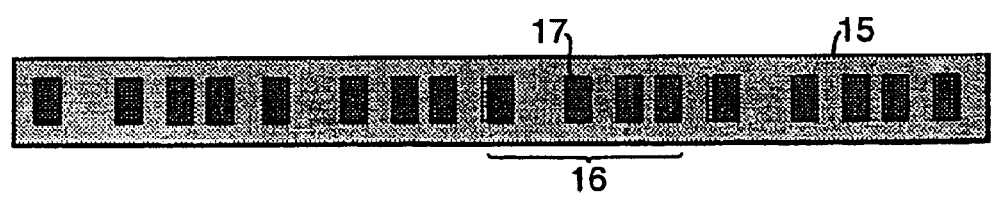
FIG. 3 shows a repeated linear information carrier according to the present invention having a recurring sequence of gaps.

The direction information can be advantageously used to interpret additional information encoded in the individual element properties. For example, for a label such as that shown in FIG. 2, it allows individual elements of the label to be unambiguously identified if the label is coded with a Bi-directional direction finding coding scheme thereby enabling the information encoded to be correctly read. FIG. 3 shows a label 15 which is encoded with a recurring sequence of gaps. By slicing an adequate length of the label, the unique sequence can be identified and the label decoded. For example FIG. 3 shows 4 cycles of a recurring code 16 each comprising four identical elements 17.

The gap sequence for the code shown in FIG. 3 is 3,1,0,1,3,1,0,1,3,1,0,1,3,1,0,1 and is four repetitions of the basic sequence of 3,1,0,1. This basic code has 4 gaps and a maximum gap of 5, which are the parameters of this example. It must be understood that the number of gaps G and the maximum gap size M are parameters of the code and may be any integer value that the reading apparatus is capable of decoding.

Provided a slice of the repeated code is taken so that at least G consecutive gaps can be measured, then the information coded into the label can be read. This will require at lest G+1 complete elements to be read. The reader must account for situations where the slicing process cuts through material elements. These partial elements may give distorted signals, which the reading apparatus must either ignore completely or interpret as the signal from a partial element. Each sequence of integers g1, g2, g3 . . . , gG whose sum is the maximum gap size therefore represents a unique code in the code space which is characterised by the number of gaps G, and the maximum gap size M. For instance, for the label shown in FIG. 3 which exhibits a fixed code repeat distance, there are a total of 56 possible codes, only some of which are unique and suitable for use in a recurring cyclical code. For instance a slice from label coded with the repeating gap sequence 3,1,0,1 could contain the gap sequence 1,0,1,3 since there is no control over where the slice of the label is taken from consequently these sequences correspond to the same code. The number of valid unique codes for this example is 14.

When decoding the gap sequence, the observed gap sequence of length G detected by the reading apparatus is "normalised", by sequential rotation such that the first gap written is the largest gap. If there are two gaps which are the same, largest size, then the adjacent gaps are compared etc. For example the code 1,0,1,3 when normalised is 3,1,0,1 and the code 2,0,1,2 when normalised is 2,2,0,1. The normalised gap sequence is then enumerated to provide an output code number. A typical enumeration method is to tabulate the valid normalised gap sequences in order of magnitude for example by ensuring that the first sequence in the table is "greater" than the second sequence, the second sequence is "greater" than the third sequence and so on. The enumerated code is then the position of the matching gap sequence in the table. The present invention therefore allows a long label to be encoded with a recurring pattern of gaps using a Bi-directional coding scheme. By slicing an adequate length of the label, the information encoded can be decoded irrespective of the direction of reading of the label slice or from where in the label the slice was taken. Each sequence of integers g1, g2, g3 . . . , gG whose sum is the maximum gap size therefore represents an unique code in the code space which is characterised by the number of gaps G, and the maximum gap size M. For instance for the label shown in FIG. 3 which has 4 gaps and maximum gap size of 5, with a fixed code repeat distance, there are total of 56 possible codes, only some of which are unique and suitable for use in a reversible cyclical code. For instance a slice from label coded with the repeating gap sequence 3,1,0,1 could contain the gap sequence 1,0,1,3 since there is no control over where the slice of the label is taken from. Consequently these sequences correspond to the same code. Similarly the sequence 2,2,0,1 could be confused with the sequence 2,2,1,0 read in the reverse direction, these sequences correspond to the same Bi-directional code. For example, the number of unique Bi-direction codes for a 4 gap, maximum gap size 5, with a fixed code repeat distance is 10.

In order to decode such a label, the "normalised" reversed and "normalised" unreversed gap sequences of length G that were read are compared, and the "larger" of the two is the gap sequence used for decoding. A typical enumeration method is to tabulate the unique normalised reversible gap sequences in order of magnitude, for example by ensuring that the first sequence in the table is "greater" than the second sequence, the second sequence is "greater" than the third sequence and so on The single entry in this table for each unique code is the "greater" of the "normalised" and "normalised" reversed forms. The enumerated code is then the position of the matching gap sequence in the table.

One embodiment of this aspect if a continuous thread-like label, a portion of which is cut and used to label an object. It is necessary to ensure that an adequate length is cut so as to allow the label to be decoded; it does not matter from where the length of label is cut.

In accordance with the present invention, a long label is encoded using a pattern of gaps with a very long repeat distance. The pattern is generated from a binary sequence generator such as a decodable de Bruijn Sequence generator, or a pseudo random generator formed typically from a shift register of N bits with feedback from the contents of two taps exclusively "OR"-ed together. The sequence generator is chosen to provide a maximum length sequence. The gaps would encode the binary elements of the sequence. When coded in this way a slice of sufficient length of the label can be decoded to give an unique position in the sequence. This unique position can be interpreted as a label code.

Embodiments of the present invention allow a long label to be encoded using a non-recurring pattern of elements whose properties, such as length and width are used to encode information. These elements are placed in a predictable grid of positions. The pattern is generated from a sequence generator such as a pseudo-random binary sequence generator or other sequence generator such as A de Bruijn sequence. The coded elements encode the binary elements of the sequence. When coded in this way a slice of sufficient length of the label can be decoded to give an unique position in the sequence. This unique position can be interpreted as a label code. The grid of positions is used to decode the direction of scanning of the label and hence is to decode the unique position of the label in the sequence to provide an unique identifier irrespective of the read direction.

Reference elements may be included at predictable intervals interspersed among the data carrying elements to simplify the decoding of the data carrying elements. These elements can also provide information to allow the direction of reading to be determined.

The positioning of the reference elements relative to the data carrying elements provides extra encoded information separate from the data code sequence. This extra information can be used as a checksum to check correct decoding, alternatively the extra information can be used to identify the label code as coming from one of a number of codes sequences.

Figure 4:
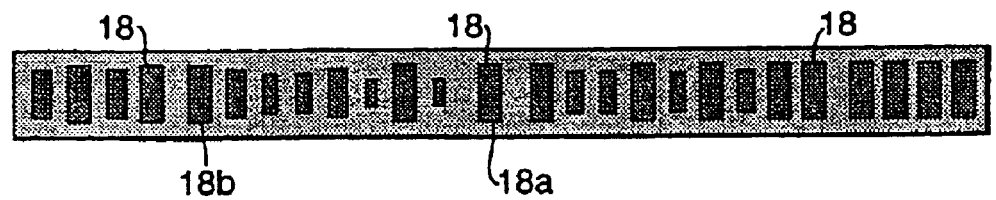
FIG. 4 shows a non-repeating code according to the present invention.

An example is shown in FIG. 4. The code consists of blocks of 8 data elements, separated by reference elements 18. The reference elements are of a known size and shape. The reference elements are identified by a unique sequence of gaps around them. For example in the code shown every second reference element 18a has a large gap either side and so can be recognised. The intermediate reference elements 18b have a large gap on one side only. In this way the references can be identified and the direction of reading can be determined. In this example there are 4 types of data element and by identifying which of the 4 types is decoded 2 bits of binary information can be found 00,01,10 or 11 in binary. The number of types of data element may be 2 or more. By concatenating the data from 16 sequential data elements, taking the direction of reading into account, and ignoring the interspersed reference elements, a 32 bit sequence results. This 32 bit sequence is unique and identifies the position in the non repeating sequence from which the 16 data elements in the label was taken.

If the element spacing is nominally 1.5 mm, this sequence does not repeat for over 3800 kilometres, assuming that the reference marker spacing are 2 mm. A slice of 30 mm of this label from anywhere is sufficient to locate position to the nearest element position, approximately 1.5 mm in the example shown. Over 100 million unique 30 mm labels are be made by subdividing this long sequence. It must be understood that the parameters are examples, the number of element types, the number of elements, the reference marking gaps and the element pitches are all parameters that can be varied in such a scheme.

In this example, the position of the reference marker is used to identify the code as coming from one of a set of eight code sequences, each of full length.

One embodiment of these long codes with non-repeating patterns is a code using magnetically active elements attached to a narrow flexible substrate in the form of a continuous thread. This thread is woven into a garment label of sufficient length so that the label sequence position can be determined. The thread does not have to be aligned in any special way with the garment label into which it is woven.

The unique position in the sequence decoded by reading the label is a unique identifier for the garment. By using a sequence, such as a decodable de Bruin Sequence, the unique identifier may be decoded into a unique serial number for the label.

Typical applications of the continuous repeated and non-repeated codes are where labelling of objects is required in situations where the manufacturing methods employed to manufacture the objects use processing of continuous material. If labelling of a particular type, family or class of object is required, codes from the repeated code family described are used so that the type, family or class of object can be represented by the code used to label the object. If the objects need to be uniquely coded, a code from the non-repeating code family is appropriate.

Furthermore long non-recurring codes can be used in conjunction with embodiments which use magnetically active elements attached to a narrow flexible substrate in the form of a continuous thread. This may used to label a security document, object, or token such as a bank note, by attaching or embedding a portion of thread. The properties of the non-recurring sequence will ensure that the document has a unique identity determined by the particular portion of sequence that forms part of the document. Using a decodable sequence, the decoded identities of the objects so labelled can arranged to be a monotonically increasing or monotonically decreasing integer numeric sequence.

Non-recurring sequences can be used in position sensing techniques in which a track is formed from a sequence of coded magnetic elements. The location of the reading antenna can be determined by reading a short portion of the sequence and finding its position in the track to the nearest element position.

What is claimed is:

1. An information carrier comprising a plurality of detectable elements supported by, or incorporated in a substrate, the elements being spaced apart from one another such that the series of spaces between the elements encodes the information carrier, characterised in that each of the spaces can be represented by A+mG, wherein A is a first fixed value, G is a second fixed value and m is an integer, the values of which are derived from integers of a predetermined mathematical sequence, and wherein the value of A is different than the value of G.

2. An information carrier as claimed in claim 1, wherein the values of the integer m are selected to be integers derived from the output of a de Bruijn sequence.

3. An information carrier as claimed in claim 1, wherein the integers m are selected to be integers derived from the output of a binary pseudo-random sequence generator.

4. An information carrier comprising a plurality of detectable elements supported by, or incorporated in a substrate, the elements being spaced apart from one another such that the series of spaces between the elements encodes the information carrier, characterised in that each of the spaces can be represented by A+mG, wherein A is a first fixed value, G is a second fixed value and m is an integer, the values of which are derived by means of a random number generator, and wherein the value of A is different than the value of G.

5. An information carrier as claimed in any one of claims 1, 4, 2 or 3, wherein said fixed values A and G are units of length.

6. An information carrier as claimed in any one of claims 1, 4, 2 or 3, wherein said fixed values A and G are angles.

7. An information carrier as claimed in any one of claims 1, 4, 2 or 3, wherein the spacing between adjacent detectable elements is measured from the midpoint of one element to the midpoint of the adjacent element.

8. An information carrier as claimed in any one of claims 1, 4, 2 or 3, wherein said detectable elements are magnetically active elements.

9. An information carrier as claimed in claim 8, wherein said magnetically active detectable elements comprise high permeability, low coercivity material having an easy axis of magnetisation.

10. An information carrier as claimed in claim 8 wherein magnetic properties of each of the magnetic elements serves to encode the information carrier.

11. An information carrier as claimed in claim 10 or wherein the magnetic properties of at least one of the elements is or are known, thereby acting as a reference element, with respect to which, the magnetic properties of the other detectable elements can be determined when decoding the information carrier.

12. An information carrier as claimed in claim 10, wherein a length of the magnetic elements is varied such that the relative lengths of said magnetic elements also serves to encode information.

13. An information carrier as claimed in any one of claims 1, 4, 2 or 3, wherein said detectable elements are formed of an optically detectable material.

14. An information carrier as claimed in any one of claims 1, 4, 2 or 3, wherein geometric properties of the elements is are varied such that the relative dimensions of the elements also serve to encode information.

15. An information carrier as claimed in claim 14 wherein the geometric properties of at least one of the elements is or are known, thereby acting as a reference element, with respect to which, the geometric properties of the other detectable elements can be determined when decoding the information carrier.

16. An information carrier as claimed in any one of claims 1, 4, 2 or 3, wherein said mathematical sequence is a recurring sequence.

17. An information carrier as claimed in any one of claims 1, 4, 2 or 3, wherein said substrate comprises a linear strip.

18. An information carrier as claimed in any one of claims 1, 4, 2 or 3, wherein the series of spaces between the elements are chosen such that the encoded information can be determined irrespective of a direction in which the information carrier is read.

19. An information carrier as claimed in claim 18, wherein said detectable elements comprise high permeability, low coercivity magnetic material having an easy axis of magnetisation.

20. An information carrier as claimed in claim 19, wherein magnetic properties of each of the magnetic elements serves to encode the information carrier.

21. An information carrier as claimed in claim 20, wherein a length of the magnetic elements is varied such that the relative lengths of said magnetic elements also serves to encode information.

22. An information carrier as claimed in claim 18, wherein said substrate comprises a linear strip.

23. An information coding method utilising a plurality of detectable elements supported by, or incorporated in a substrate, the elements being spaced apart from one another such that the series of spaces between the elements encodes the information carrier, characterised in that each of the spaces can be represented by A+mG, wherein A is a first fixed value, G is a second fixed value and m is an integer the values of which are derived from integers of a predetermined mathematical sequence, and wherein the value of A is different to the value of G.

24. An information coding method utilising a plurality of detectable elements supported by, or incorporated in a substrate, the elements being spaced apart from one another such that the series of spaces between the elements encodes the information carrier, characterised in that each of the spaces can be represented by A+mG, wherein A is a first fixed value, G is a second fixed value and m is an integer, the values of which are derived by means of a random number generator, and wherein the value of A is different to the value of G.

25. An information coding method as claimed in claim 23 or 24 wherein the method utilises an information carrier as claimed in any one of claims 4, 2 or 3.

26. An information coding method as claimed in claim 23 or 24, wherein the encoded information is determined by detecting the spacing between each pair of adjacent elements and expressing the spacings as a sequence which maintains the order of spacings on the tag, but commences with the spacing of greatest magnitude, and wherein if there are two or more spacings equal to the greatest magnitude, the starting value of the sequence is selected such that the sequence, if read as a number, would have the highest possible value.

27. An information coding method as claimed in claim 23 or 24, wherein the encoded information is determined by detecting the spacing between adjacent elements when considered in turn along a predetermined path.

28. An information coding method as claimed in claim 23 or 24, wherein the encoded information is determined by the following steps:

i) determining the sequence of spacings between adjacent elements when considered in turn along a first predetermined path;

ii) determining the sequence of spacings between adjacent elements when considered in turn along a second predetermined path which is opposite in direction to the first predetermined path;

iii) selecting one of the sequences of spacings by performing an iterative comparison of successive spacings in each of the paths, the selected sequence being the first one which generates a larger spacing than the other sequence during said iterative comparison; and iv) decoding the selected sequence to determine the encoded information.

* * * * *